United States Patent [19]

Kellström et al.

[11] Patent Number: 5,586,826

[45] Date of Patent: Dec. 24, 1996

[54] ROLLER BEARING PROVIDED WITH ROLLER SKEW CONTROL AND LONG LIFE CHARACTERISTICS

[75] Inventors: Magnus Kellström, Partille; Joacim Fogelström, Billdal, both of Sweden; Henning Wittmeyer, Hilversum, Netherlands

[73] Assignee: SKF Sverige AB, Gothenburg, Sweden

[21] Appl. No.: 358,314

[22] Filed: Dec. 19, 1994

[51] Int. Cl.$^6$ ........................................ F16C 19/28
[52] U.S. Cl. ........................ 384/450; 384/571; 384/625
[58] Field of Search .................................. 384/450, 569, 384/571, 516, 625

[56] References Cited

U.S. PATENT DOCUMENTS

| | | |
|---|---|---|
| 3,990,753 | 11/1976 | Kellstrom et al. . |
| 4,379,599 | 4/1983 | Sundqvist ............................. 308/187 |
| 5,064,298 | 11/1991 | Hibi et al. ............................. 384/625 |
| 5,145,267 | 9/1992 | Takata et al. ......................... 384/558 |
| 5,456,538 | 10/1995 | Honda et al. ......................... 384/450 |

FOREIGN PATENT DOCUMENTS

| | | |
|---|---|---|
| 4037734 | 6/1991 | Germany . |
| 2219359 | 12/1989 | United Kingdom . |

OTHER PUBLICATIONS

Kellstrom, E. M., "Rolling Contact Guidance of Rollers in Spherical Roller Bearings", *The American Society of Mechanical Engineers*, United Engineering Center, 345 East 47th Street, New York, New York pp. 1–8. (no date).

Tripp, J. H. et al., "Effects of Surface Roughness on Rolling Bearing Life", *Proceedings of Japan International Tribology Conference*, Nagoya, 1990, pp. 792–802.

*Primary Examiner*—Lenard A. Footland
*Attorney, Agent, or Firm*—Burns, Doane, Swecker & Mathis, L.L.P.

[57] ABSTRACT

A roller bearing includes an inner raceway member having an inner raceway surface and an outer raceway member having an outer raceway surface. The inner and outer raceway surfaces are spaced apart from one another to define an annular space and a plurality of rolling elements are disposed in the annular space for engaging the inner and outer raceway surfaces as the rolling elements roll in a rolling direction. During operation of the roller bearing, friction forces arise at regions of the inner and outer raceway surfaces that give rise to positive skew moments. Those regions of the raceway surfaces are designed to have greater frictional characteristics than those regions of the inner and outer raceway surfaces where negative skew moment producing friction forces arise. In that way, the skew of the roller can be controlled to be not excessively negative.

8 Claims, 5 Drawing Sheets

| | | $R_t$ | $R_a$ | $R_p$ | $R_p/R_a$ | $t_p$ 0.25 |
|---|---|---|---|---|---|---|
| – – – – reference line | | | | | | |
| ————— centre line | | | | | | |
| | | 1 | 0.19 | 0.27 | 1.4 | 65% |
| | | 1 | 0.19 | 0.73 | 3.8 | 10% |
| | | 1 | 0.2 | 0.2 | 1 | 78% |
| | | 1 | 0.2 | 0.8 | 4 | 9% |
| | | 1 | 0.18 | 0.22 | 1.19 | 68% |
| | | 1 | 0.18 | 0.78 | 4.35 | 5% |
| | | 1 | 0.32 | 0.5 | 1.57 | 35% |
| | | 1 | 0.25 | 0.5 | 2 | 35% |
| | | 1 | 0.25 | 0.5 | 2 | 35% |
| | | 1 | 0.5 | 0.5 | 1 | 50% |

ROLLER BEARING PROVIDED WITH ROLLER SKEW CONTROL AND LONG LIFE CHARACTERISTICS

FIELD OF THE INVENTION

The present invention relates to roller bearings and more particularly to spherical roller bearings that are provided with a mechanism for effecting roller skew control.

BACKGROUND OF THE INVENTION

Roller bearings such as double-row spherical roller bearings are used in various applications and are preferably designed to accommodate axial forces as well as radial forces. Roller bearings of this type typically include a plurality of rollers disposed between an outer ring (raceway) and an inner ring (raceway), and a flange or loose guide ring is provided for guiding the rollers. During operation, the rollers contact the outer ring, the inner ring, and the flange or guide ring. This contact produces friction forces between the rollers and the raceway surfaces. The tendency of the rollers to assume an equilibrium position causes the rollers to assume a certain angle relative to the rolling direction, referred to as the skew angle. This results in undesirable sliding of the rollers in a direction generally parallel to the roller axis.

The skew angle is defined as the angle between the axis of rotation of the roller and a plane normal to the path of relative motion of the raceway which confronts the rollers. This skew angle imparts to the roller surface a sliding velocity component in the axial direction at its contact with the raceway surfaces. As a result, an axial friction force will act on the inner and outer raceways and the rollers. If the direction, or sign, of the skew angle changes, the directions of the axial friction forces will change at the roller/raceway contacts.

The skew angle is defined as being positive when the friction force components acting on the roller in the axial direction are so directed that they add to or are co-directional to the axial component of the normal contact force acting on the roller at the same contact. The skew angle is also defined to be positive when the friction force components on a raceway in the axial direction are so directed that they counteract the axial load component of the external load acting on the raceway.

In many known types of roller bearings, the rollers tend to assume a negative skew angle in which the axial component of the friction forces arising in a contact zone between the rolling element and the raceway, and acting on the raceway is directed in a manner that adds to the external axial load acting on the ring. It has been determined that negative skew angles result in undesirable higher friction losses and lower bearing life than corresponding positive skew angles, particularly when the bearing load conditions contain substantial axial components. Thus, a roller bearing in which the skew angle of the rollers is controlled so as not to be excessively negative is highly desirable.

SUMMARY OF THE INVENTION

The roller bearing of the present invention is advantageously designed to control the skew angle which the rollers assume during operation in order to increase the bearing life and improve the operational characteristics of the roller bearing. More particularly, the roller bearing of the present invention is designed so that the rollers assume a skew angle which is not excessively negative, and possibly even zero or positive, during operation.

In accordance with one aspect of the invention, a roller bearing comprises an inner member having at least one inner raceway and an outer member having at least one outer raceway. The at least one inner raceway and the at least one outer raceway are spaced apart to define an annular space in which is located a row of rolling elements. The rolling elements are adapted to engage the at least one inner raceway and the at least one outer raceway at respective contact zones. Each rolling element has an axis and is positioned at a skew angle when the rolling element axis and the axis of the roller bearing are other than coplanar, the skew angle being positive when axial components of the friction forces acting on the rolling element and arising between the rolling element and either raceway in the respective contact zone are co-directional to an axial component of a normal force acting on the rolling element. The roller bearing also includes friction producing means for producing frictional coefficients at two spaced apart and separate first locations across a width of at least one of the outer raceway and the inner raceway which is different from a frictional coefficient at a second location disposed between the two first locations, the first locations being disposed at positions in which the friction forces acting on the rolling elements contribute to creation of a positive skew moment.

In accordance with another aspect of the invention, a roller bearing includes an inner member having at least one inner raceway and an outer member having at least one outer raceway, the at least one inner raceway and the at least one outer raceway being spaced apart to define an annular space in which is located rolling elements arranged in an annular row. The rolling elements are adapted to engage the at least one inner raceway and the at least one outer raceway at respective contact zones with the row of rolling elements moving in a rolling direction relative to the inner and outer raceways. The rolling elements are positioned at a skew angle when the rolling element axis and the axis of the roller bearing are other than coplanar, with the skew angle being positive when axial components of the friction forces acting on the rolling element and arising between the rolling element and either raceway in the respective contact zone are co-directional to an axial component of a normal force acting on the rolling element. In addition, the roller bearing includes means for providing a frictional coefficient at at least a first location across a width of at least one of the outer raceway and the inner raceway that is different from the frictional coefficient at a second location on the same one of the inner and outer raceway, with the first location having a frictional coefficient that is different from a frictional coefficient at the second location. The first location is located at a position in which the friction forces acting on the rolling elements contribute to creation of a positive skew moment and the means for providing a frictional coefficient including the surface profile of the raceway member at the first location producing a greater frictional coefficient than the surface profile of the raceway at the second location.

According to another aspect of the invention, the roller bearing comprises an inner member having at least one inner raceway and an outer member having at least one outer raceway with the inner raceway and the outer raceway having surfaces which are spaced apart to define an annular space in which is located a plurality of rolling elements arranged in a row. The row of rolling elements are adapted to engage the inner raceway and the outer raceway at respective contact zones. The rolling elements are positioned at a skew angle when the rolling element axis and the axis of the roller bearing are other than coplanar, the skew angle being positive when axial components of the friction forces acting on the rolling element and arising between the rolling element and either raceway in the respective contact zone are co-directional to an axial component of a normal force acting on the rolling element. The inner and outer raceway surfaces have a surface lay with respect to the rolling direction and a surface roughness $R_a$. The roller bearing is designed so that a combination of surface roughness $R_a$ and surface lay at at least one portion of the inner raceway surface defines a frictional coefficient which is different from a frictional coefficient defined by a combination of surface roughness $R_a$ and surface lay at at least one portion of the outer raceway surface. In addition, the inner and outer raceway surfaces each have a surface profile which possesses a skewness $R_{sk}$ less than −1 and a root mean square slope value less than 2.5 degrees.

DETAILED DESCRIPTION OF THE INVENTION

Figure 1:
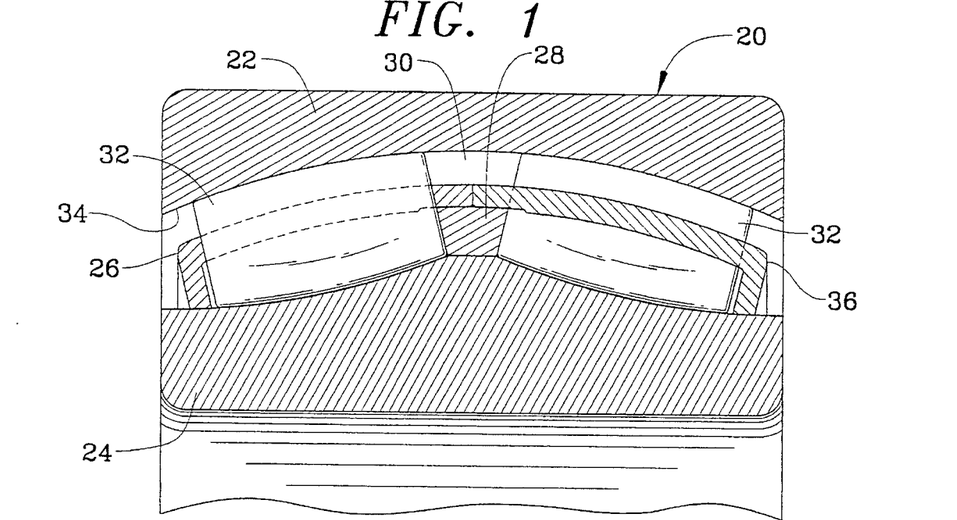
FIG. 1 is a cross-sectional view illustrating a double-row spherical roller bearing.

With reference to FIG. 1, a double-row spherical roller bearing 20 includes an outer raceway member 22 and an inner raceway member 24. The outer raceway member 22 is provided with an outer raceway or outer raceway surface 34 while the inner raceway member 24 is provided with an inner raceway or inner raceway surface 36. The outer and inner raceway surfaces 34, 36 are spaced apart to define an annular space 30. Positioned within the annular space 30 are two rows of rollers 32. A loose guide ring 28 can be positioned between the two rows of rollers. A cage 26 is also provided to circumferentially space the rollers 32.

Figure 2:
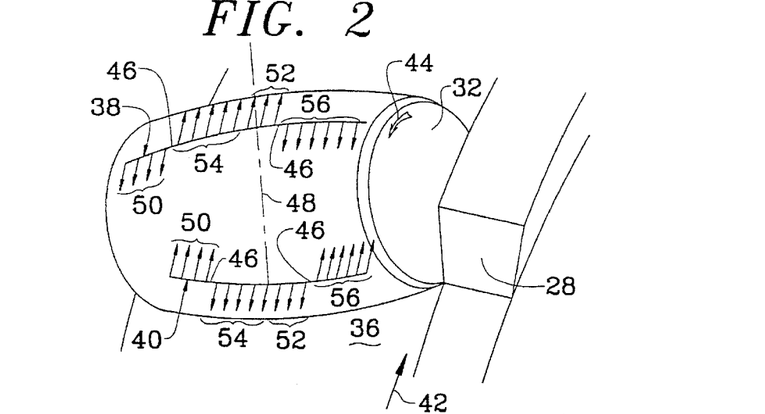
FIG. 2 is a perspective view of a portion of the roller bearing depicted in FIG. 1 illustrating friction forces that arise between the roller and the inner and outer raceways.
Figure 3:
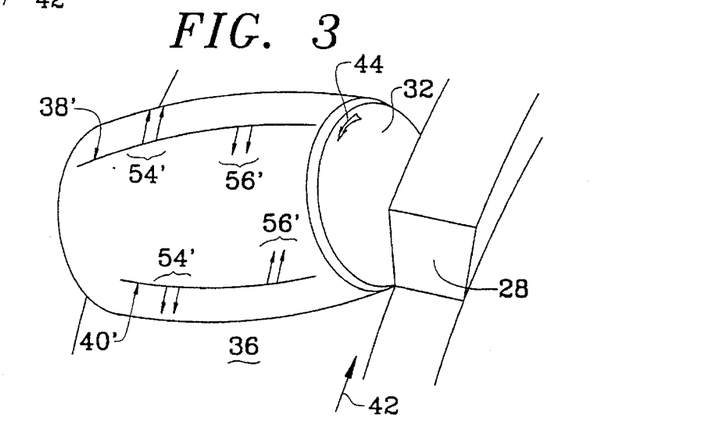
FIG. 3 is a perspective view of a roller illustrating the resultant friction forces that exist between the rollers and the inner and outer raceways.

As described in more detail in U.S. Pat. No. 3,990,753, the entire disclosure of which is incorporated herein by reference, during operation of a spherical roller bearing such as the one shown in FIG. 1, the rollers 32 tend to roll with accompanying sliding motion along the inner and outer raceways 34, 36. This sliding motion generates friction forces between the outer raceway surface 34 and the outer peripheral surface of the rollers 32, as well as between the inner raceway surface 36 and the outer peripheral surface of the rollers 32. FIGS. 2 and 3 generally illustrate such friction forces associated with a single roller 32.

As noted above, the roller bearing actually includes two spaced apart, generally side-by-side rows of rollers. For purposes of simplicity and ease of understanding, FIGS. 2 and 3 only illustrate a single roller in one of those two rows of rollers.

The set of arrows 38 disposed along the top portion of the roller 32 in FIG. 2 represents the frictional forces that arise during a hypothetical loading condition between the outer raceway 34 and the outer surface of the roller 32, while the set of arrows 40 disposed adjacent the bottom portion of the roller 32 represents the frictional forces that arise during a hypothetical loading condition between the inner raceway 36 and the outer surface of the roller 32. In the illustrated embodiment, it is assumed that the roller bearing is operating such that the inner raceway member is rotating into the plane of the paper (in the direction of arrow 42) while the roller 32 is rotating out of the plane of the paper (in the direction of the arrow 44).

The frictional force distributions shown in FIG. 2 include inflection points 46 which correspond to the rolling points. Typically, the forces acting on the roller 32 in the roller bearing are such that the rolling points 46 are not symmetrical in relation to the center plane 48 of the roller 32 (i.e., the plane which passes through the center of the roller 32 and is perpendicular to the longitudinal axis of the roller 32). In fact, the rolling points 46 actually move to varying extents depending upon the loading conditions. Since the rolling points 46 are not symmetrical with respect to the center plane 48 of the roller 32, the friction forces are distributed in such a way that they do not completely neutralize or cancel out one another. Rather, the friction forces create a moment which tends to skew the roller 32. Contributing to creation of this moment are the magnitude and direction of the friction force at any given point (i.e., the product of the load at the given point and the coefficient of friction of the raceways at the given point), and the distance between the friction force acting at a given point and the center plane 48 of the roller. This moment is called the skew moment.

In the situation shown in FIG. 2 in which the inner raceway member is moving into the plane of the paper (so that the outer ring is moving out of the plane of the paper towards the reader), its skew moment tends to skew the roller 32 in the negative direction to result in a negative roller skew angle. On the other hand, the skew moment created by the outer ring is the reverse of the inner ring and tends to pivot the roller 32 in the opposite direction. Thus, the skew moment created by the outer ring tends to skew the roller 32 in the positive direction to result in a positive roller skew angle.

The skew angle is defined as being positive when the friction force components acting on the roller 32 in the axial direction are directed so that they add to or are co-directional to the axial component of the normal contact force acting on the roller 32 at the same contact. The skew angle is also defined as being positive when the friction force components on a raceway in the axial direction are directed so that they counteract the axial load component of the external load acting on that raceway. Further, a negative skew angle arises when the axial component of the friction forces arising in a contact between the roller and raceway, and acting on the roller is directed so as to counteract or subtract from the axial component of the normal contact load acting on the rolling element in the same contact.

Figure 14:
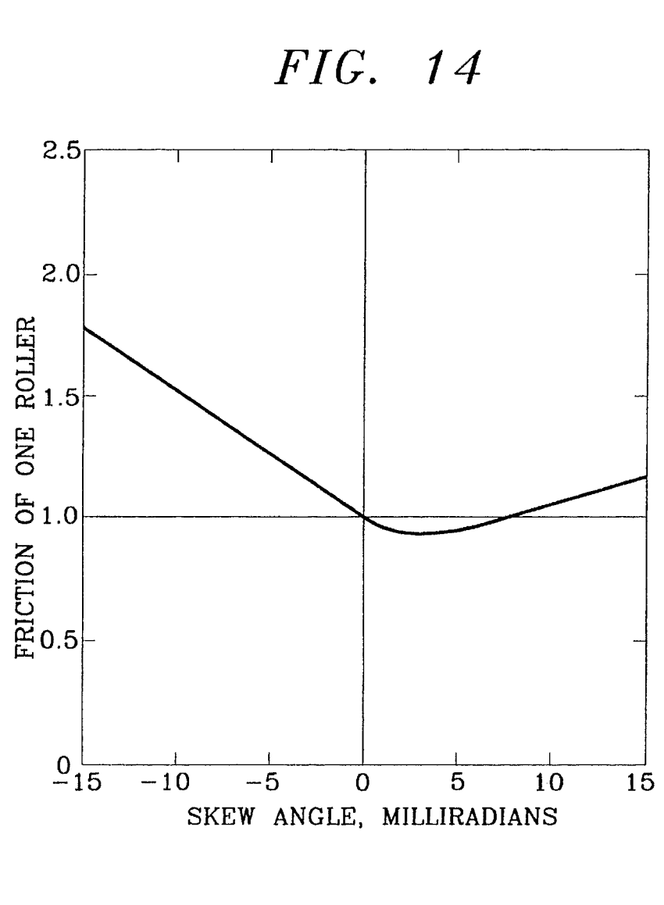
FIG. 14 is a graph of roller friction versus skew angle.

It has been found, particularly in the case of bearing load conditions which contain significant axial components, that negative skew angles result in higher friction losses and lower bearing life than corresponding positive skew angles. As can be seen with reference to FIG. 14, it is not necessary to design the roller bearing to have no skew angle in order to reduce friction. Rather, a reduction in friction can be achieved by designing the roller bearing so that the roller skew angle is not excessively negative.

The roller bearing of the present invention is designed to achieve a roller skew angle that is not excessively negative, possibly even positive. By identifying the friction forces on a roller bearing which contribute to the creation of positive and negative skew moments, and designing the roller bearing so that the friction forces which produce positive skew moments are increased while the frictional forces which create negative skew moments are reduced, the roller bearing of the present invention achieves a significant increase in service life and greatly improved operational characteristics. That is, by designing the roller bearing so that in the equilibrium condition the skew angle is not excessively negative, the operational characteristics and performance of the roller bearing can be improved, thereby leading to an increase in useful life for the bearing.

With respect to the friction forces 38 arising between the outer raceway member 22 and the outer surface of the roller 32 as seen in FIG. 2, the friction forces in the outermost side region 50 and the inner center side region 52 of the outer raceway 34 create a negative skew moment while the friction forces in the outer center side region 54 and the innermost side region 56 of the outer raceway 34 create a positive skew moment. In the case of the friction forces 40 which arise between the outer surface of the roller 32 and the inner raceway member 24, the friction forces in the outer center side region 54 and the innermost side region 56 of the inner raceway member 36 create a negative skew moment, while the friction forces in the inner center side region 52 and the outermost side region 50 of the inner raceway 36 create a positive skew moment.

Some of the friction forces illustrated in FIG. 2 balance or cancel one another out at least to some degree and the result is the frictional force distribution shown in FIG. 3. In the resulting friction force distribution 38' between the outer raceway member 22 and the roller 32, the friction forces in a portion 54' of the outer center side region and the friction forces in a portion 56' of the innermost side region remain and contribute to creation of a positive skew moment. On the other hand, in the resulting friction force distribution that occurs between the inner raceway member 24 and the roller 32, the friction forces in a portion 54' of the outer center side region and the friction forces in a portion 56' of the innermost side region cause negative skew moments.

One reason why the friction forces in the portions 54', 56' between the inner raceway 36 and the roller 32 do not exactly cancel out the friction forces in the portions 54', 56' between the outer raceway 34 and the roller 32 is because the film thickness is typically lower at the inner raceway contact than at the outer raceway contact due to higher temperature and pressure, the latter of which is based on the convex/convex roller to inner raceway contact area as opposed to the convex/concave roller to outer raceway contact area. Assuming the inner and outer raceway surfaces are substantially the same, metal to metal contact interaction is greater at the inner raceway contact and therefore the friction is greater at that location. Thus, the roller assumes a negative equilibrium skew angle.

Figure 4:
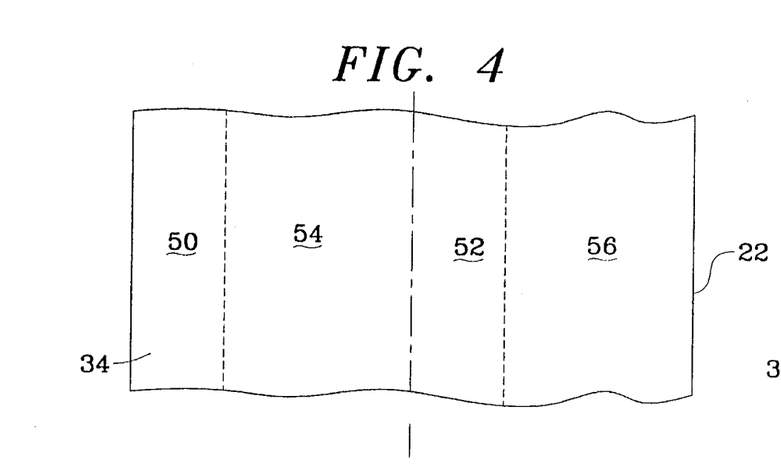
FIG. 4 is a plan view of the outer raceway member shown in FIG. 1 depicting the various regions of the outer raceway surface in which friction forces arise.

FIG. 4 is a plan view of a portion of the outer raceway member 22 illustrating in particular the outer raceway surface 34. Illustrated in FIG. 4 are the various regions of the outer raceway surface 34 at which friction forces arise. Friction forces arising in the outermost side region 50 and the inner center side region 52 of the outer raceway 34 create negative skew moments while friction forces arising in the outer center side region 54 and the innermost side region 56 of the outer raceway 34 create positive skew moments.

As noted above, when the roller skew angle is excessively negative, the operating life and working efficiency of the spherical roller bearing are undesirably reduced. Thus, in accordance with the present invention, the spherical roller bearing is designed to achieve a skew angle which is not excessively negative. This is done by configuring or appropriately altering the surface texture or surface characteristics of the inner and outer raceways 34, 36 in a way that increases the frictional forces contributing to achievement of positive skew moments while avoiding a similar increase in the friction forces which contribute to achievement of a negative skew moment or possibly reducing the negative skew moment producing friction forces.

Figure 8:
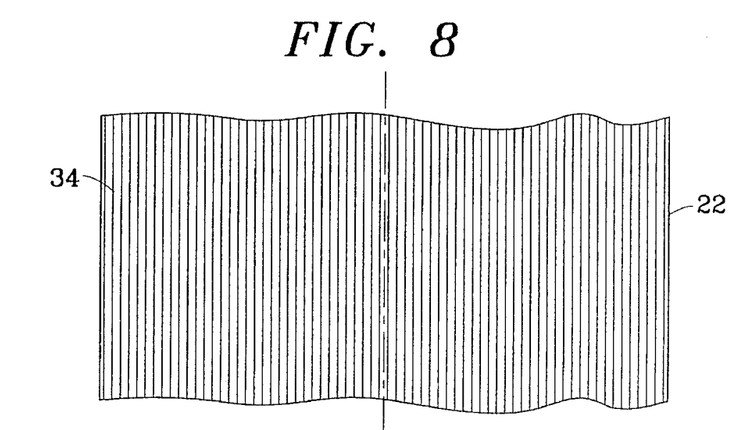
FIG. 8 is a plan view of the outer raceway member illustrating a different surface orientation or lay for achieving roller skew control.

One way of achieving this objective in accordance with the present invention is to provide the inner and outer raceway surfaces 34, 36, or certain specified portions thereof, with surface textures or topographies having a different roughness $R_a$. With reference to FIG. 8, roughness $R_a$ is the universally recognized parameter of roughness and is defined as the arithmetic mean of the departures y of the surface profile from the mean line. In equation form, the roughness $R_a$ is expressed in the following manner:

$$R_a = \frac{1}{L} \int_0^L |y| dx$$

Figure 5:
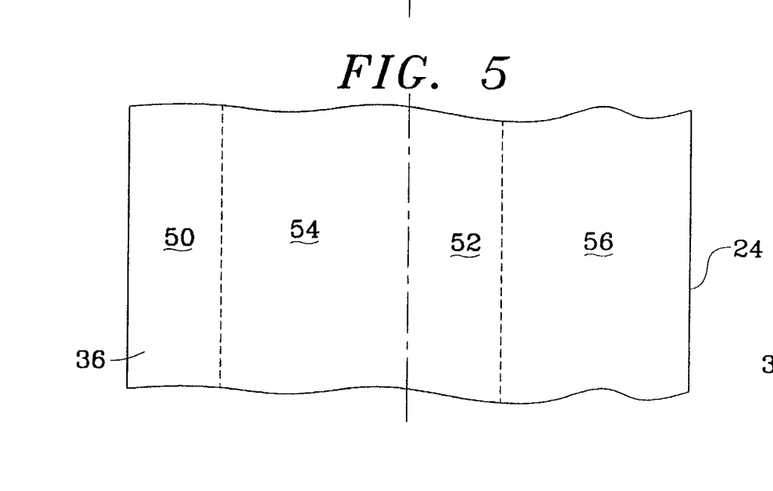
FIG. 5 is a plan view of the inner raceway member illustrating the various regions in which friction forces arise.
Figure 11:
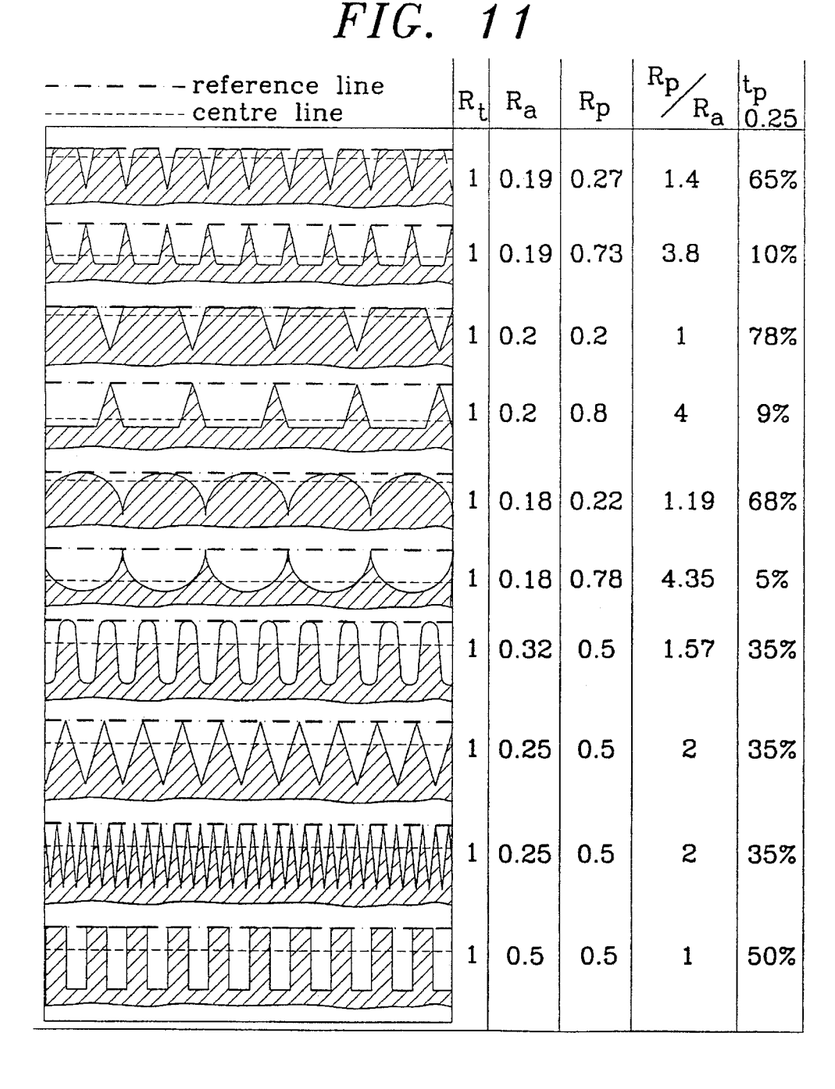
FIG. 11 is a table which sets forth various parameters associated with different surface profiles.

By configuring the surface texture or topography of the inner and outer raceways 24, 26 illustrated in FIGS. 4 and 5, or various regions thereof, in a manner particularly selected to produce different roughness parameters $R_a$, the skew of the roller bearing can be controlled. For purposes of illustration, FIG. 11 depicts the relative roughness $R_a$ associated with various cross-sectional groove configurations or profiles. The column designated $R_t$ represents the distance between the highest and lowest points in the profile. In the table shown in FIG. 11, the value for $R_t$ for each cross-section has been normalized to "1" for comparison purposes.

The roughness $R_a$ of the raceway surfaces (or specified portions thereof) can be appropriately altered and changed in various ways to achieve the aforementioned objectives with greater frictional characteristics being provided by surface textures having a greater roughness $R_a$ value.

For example, the outer raceway surface 34 can be configured so that the outer center side region 54 and the innermost side region 56 possess a surface texture whose roughness $R_a$ is greater than the roughness $R_a$ associated with the surface texture in the outermost side region 50 and the inner center side region 52. Likewise, the inner raceway surface 36 can be configured such that the outermost side region 50 and the inner center side region 52 possess surface textures having a roughness $R_a$ greater than the roughness $R_a$ defined by the surface textures in the outer center side region 54 and the innermost side region 56. In that way, it is possible to avoid excessive negative skew angles, and possibly even achieve zero or positive skew angle.

In one alternative, the roughness $R_a$ of the innermost region 56 and the outer center side region 54 of the outer raceway surface 34 can be substantially the same while the roughness $R_a$ associated with the outermost side region 50 and the inner center side region 52 of the outer raceway surface 34 can be substantially the same. Further, the regions 50, 52 of the inner raceway surface 36 can be configured to possess the same roughness $R_a$ while the regions 54, 56 of the inner raceway surfaces 36 possess the same roughness $R_a$.

It is, of course, to be understood that the various regions 50, 52, 54, 56 can all be provided with surface textures having different roughness values $R_a$ which define different frictional characteristics. For example, with respect to the outer raceway 22, all of the regions 50, 52, 54, 56 can be provided with a surface texture or topography having a different roughness $R_a$, so long as the roughness $R_a$ of both the outer center side region 54 and the innermost side region 56 is greater than the roughness $R_a$ of the outermost side region 50 and the inner center side region 52.

As a practical matter, it may not be useful or cost beneficial to manufacture inner and outer raceway members 24, 22 in which portions of the respective raceway surfaces 36, 34 possess textures having different values of roughness $R_a$. Thus, as an alternative, the entire outer raceway member 22 can be provided with a surface texture having a roughness $R_a$ that is greater than the roughness $R_a$ associated with the surface texture across the entire inner raceway member 22.

As noted above, the resultant friction forces associated with the outer raceway member 22 exist in portions 54', 56' of the outer center side region 54 and the innermost side region 56, and contribute to creation of a positive skew moment. Thus, the provision of a surface texture in the outer raceway member which has a greater roughness $R_a$ accentuates the positive skew moment producing effect associated with those resultant friction forces. On the other hand, the resultant friction forces in the inner raceway member 24, which are located in the portions 54', 56' of the outer center side region 54 and the innermost side region 56 of the inner raceway 36, produce a negative skew moment. Thus, the provision of a surface texture along the entire inner raceway member 24 having a smaller roughness $R_a$ causes the negative skew moment producing effect associated with the resultant friction forces to be reduced. The overall result of having inner and outer raceway members 24, 22 configured in the foregoing manner is a roller bearing in which the skew angle is not excessively negative, and possibly even zero or positive.

The frictional characteristics associated with the inner and outer raceway surfaces 34, 36 can be altered not only by appropriately selecting a surface texture or topography for the raceway members or portions of the raceway members, but also through different surface orientations or lays. During the manufacture of the roller bearings, the raceway surfaces 34, 36 are subjected to various finishing and finishing-type operations such as turning, grinding and polishing. These steps result in a certain orientation or lay of the raceway surface, almost appearing as oriented grooves. In accordance with the present invention, the surface orientation or lay is selected in such a way as to increase the friction in areas that produce positive skew moments and reduce the friction in the areas that contribute to creation of negative skew moments.

Figure 6:
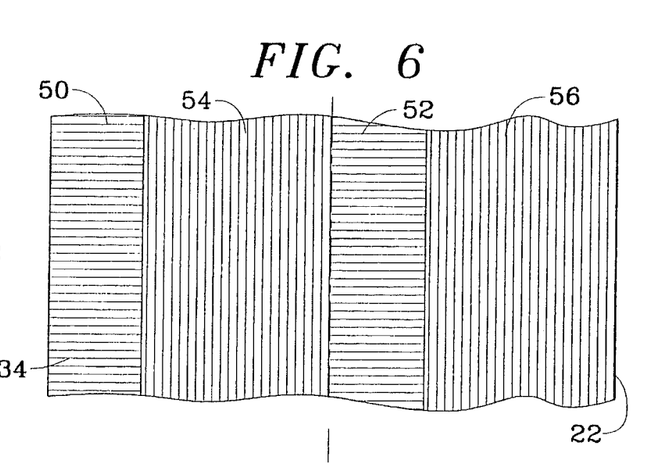
FIG. 6 is a plan view of the outer raceway member illustrating a particular surface lay or orientation of the outer raceway for purposes of achieving roller skew control.

With reference to FIG. 6, the surface lay of the outer raceway member 22 in the outer center side region 54 and the innermost side region 56 is longitudinally oriented (i.e., is parallel to the rolling direction of the rollers) while in the outermost side region 50 and the inner center side region 52 of the outer raceway member 22 the surface lay is transversely oriented (i.e., is perpendicular to the rolling direction of the rollers). On the other hand, the inner raceway member 24 in the outermost side region 50 and the inner center side region 52 possesses a longitudinally oriented surface lay while the inner raceway member 24 possesses a surface lay that is transversely oriented in the outer center side region 54 and the innermost side region 56.

A longitudinally oriented surface lay (i.e., a surface lay orientation that is parallel to the rolling direction of the rollers) affects the thickness of the lubricant layer that exists between the roller and the raceway surface in a way that produces greater friction than in the case of a transversely oriented surface lay (i.e., a surface lay that is oriented transverse to the rolling direction of the rollers). Thus, since the friction forces arising in the outermost side region 50 and the inner center side region 52 of the outer raceway 34, and the outer center side region 54 and the innermost side region 56 of the inner raceway 36 contribute to the creation of negative skew moments, the use of a transversely oriented surface lay in those areas reduces the friction that arises in those areas between the outer surface of the roller 32 and the inner and outer raceways 36, 34.

On the other hand, friction forces arising in the outer center side region 54 and the innermost side region 56 of the outer raceway 34, and the outermost side region 50 and the inner center side region 52 of the inner raceway 36 effect a desirable positive skew moment. Thus, by utilizing a longitudinally oriented surface lay in these areas, it is possible to increase the frictional force in these areas and thereby avoid excessive negative skew angles and possibly achieve a zero or positive skew angle.

Figure 7:
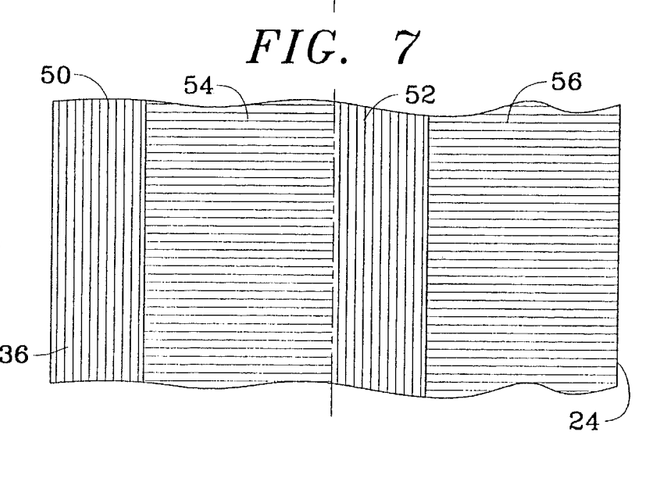
FIG. 7 is a plan view of the inner raceway member illustrating a particular surface lay or orientation of the inner raceway for achieving roller skew control.

Of course, it is to be understood that the surface lay need not be precisely parallel to the rolling direction and perpendicular to the rolling direction as illustrated in FIGS. 6 and 7. Rather, the surface lay of the inner and outer raceway members can be angularly oriented relative to the rolling direction to achieve the desired frictional characteristics between the various regions of the inner and outer raceways 36, 34. The closer the surface lay is to being oriented parallel to the rolling direction, the greater the friction that will exist between the outer surface of the rollers 32 and the raceways 34, 36, while the closer the surface lay is to being oriented perpendicular to the rolling direction, the lower the friction that will exist between the outer surface of the rollers 32 and the raceways 34, 36.

The surface lay in the regions 50, 52 of the outer raceway 34 can be oriented in the same manner while the surface lay in the regions 54, 56 of the outer raceway 34 can be similarly oriented. Likewise, the regions 54, 56 of the inner raceway 36 can be provided with similarly oriented surface lays as can the regions 50, 52 of the inner raceway 36.

Alternatively, it is to be understood that the various regions 50, 52, 54, 56 of one or both of the raceways can all be provided with surface lays that are differently oriented.

Figure 9:
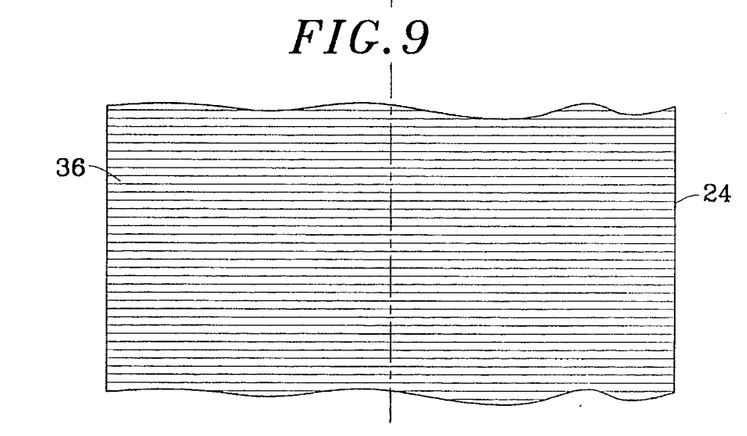
FIG. 9 is a plan view of the inner raceway member illustrating a different surface lay or orientation for achieving roller skew control.

From a practical standpoint, it may not be cost beneficial to manufacture inner and outer raceway members 24, 22 in which each region 50, 52, 54, 56 of the respective raceways 36, 34 is provided with a differently oriented surface lay. Thus, as an alternative to the inner and outer raceway members 24, 22 shown in FIGS. 6 and 7, the inner and outer raceway members 24, 22 can take the forms shown in FIGS. 8 and 9. Here, a longitudinally extending surface lay (i.e., a surface lay oriented parallel to the rolling direction of the rollers) is provided across the entire width of the outer raceway member 22. In the case of the inner raceway member 24, the surface lay extends transversely (i.e., the profile or groove configuration is perpendicular to the rolling direction of the rollers) across the entire width of the raceway 36.

Figure 10:
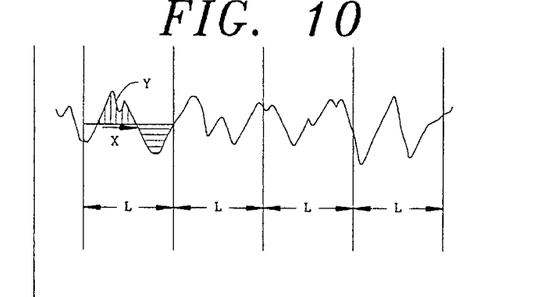
FIG. 10 is a cross-section of a surface profile illustrating various parameters for use in determining the roughness of the surface texture.

The resultant friction forces associated with the outer raceway member 22 exist in portions 54', 56' of the outer center side region 54 and the innermost side region 56, and produce a positive skew moment. Thus, the provision of a longitudinally extending surface lay across the entire outer raceway member 22 accentuates the positive skew moment producing effect associated with those resultant friction forces. On the other hand, the resultant friction forces in the inner raceway member 24, which are located in the portions 54', 56' of the outer center side region 54 and the innermost side region 56 of the inner raceway 36, produce a negative skew moment. Thus, the provision of a transversely oriented surface lay along the entire inner raceway member 24 causes the negative skew moment producing effect associated with that profile or groove configuration to be reduced. The overall result of a roller bearing having inner and outer raceway members 22, 24 configured in the manner shown in FIGS. 10 and 11 is a roller bearing which assumes a skew angle that is not excessively negative, and possibly even zero or positive.

Once again, it is to be understood that the surface lay need not be precisely parallel to the rolling direction or perpendicular to the rolling direction as illustrated in FIGS. 6 and 7. Rather, the surface lay can be angularly oriented relative to the rolling direction to achieve the desired affect on the friction forces that arise between the various regions of the inner and outer raceway members 24, 22. In addition, the inner and outer raceways can be provided with transversely oriented surface lays in two different directions, both of which preferably are oriented at the same angle with respect to the rolling direction.

Figure 12:
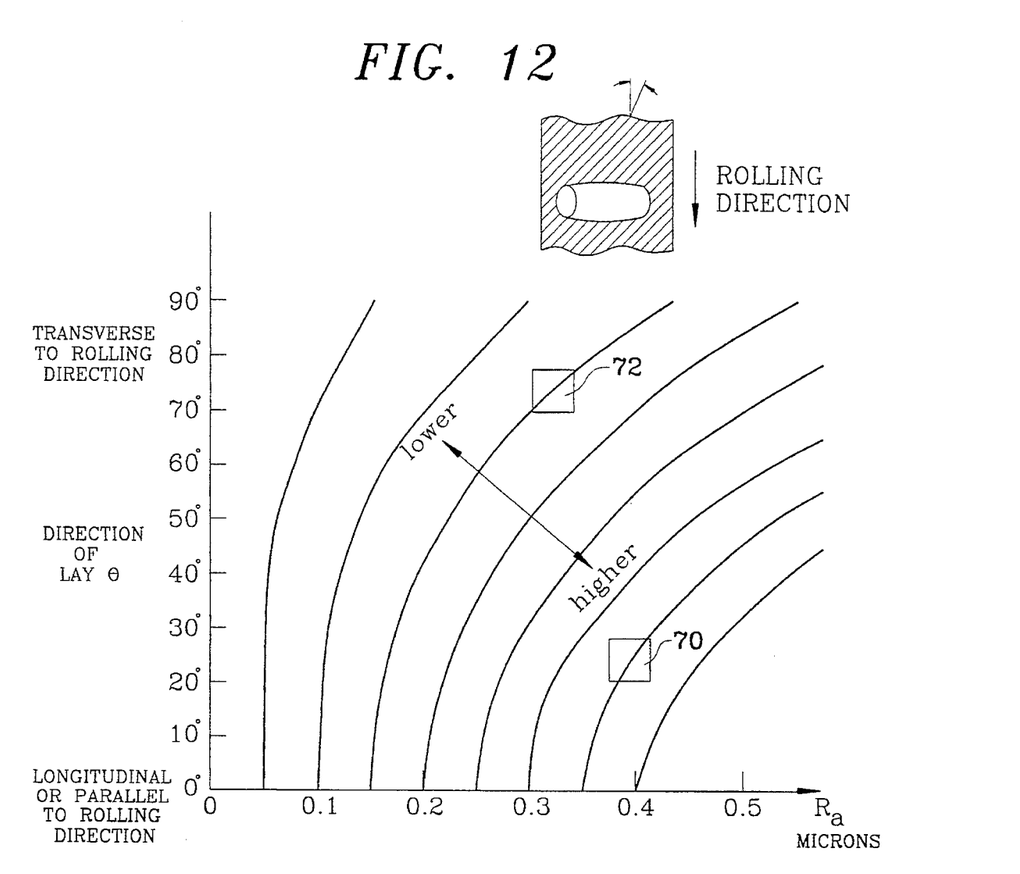
FIG. 12 is a graph of the roughness of a surface texture verses the direction of lay or orientation of the surface.

It has been found to be of significant importance to design the inner and outer raceway members in a manner that takes into account both the surface roughness $R_a$ characteristics of a particular surface as well as the lay or orientation of the surface. FIG. 12 is a graph of surface roughness $R_a$ versus direction of surface lay of the raceway members 22, 24. The direction of lay refers to the angle θ the surface texture makes with respect to the rolling direction of the rollers. As mentioned above, friction can be maximized by orienting the surface lay parallel to the rolling direction, and friction can be minimized by orienting the surface lay perpendicular to the rolling direction. As also mentioned above, the orientation or disposition of the surface lay relative to the rolling direction can be selected to be between zero and 90° depending upon the degree or amount of friction desired. Further, a particular roughness value $R_a$ can be achieved for the raceway member or portion thereof by altering the configuration of the surface texture.

Each line illustrated in the graph of FIG. 12 represents a line of equal friction or so-called isofriction. By way of example, a raceway having a surface lay which is arranged parallel to the rolling direction (i.e., a lay of 0°) and which possesses a surface texture defining a roughness value $R_a$ of 0.1 microns is, in terms of friction producing effect, substantially the same as a raceway surface having a lay which is arranged perpendicular to the rolling direction (i.e., a lay of 90°) and which possesses a surface texture whose roughness value $R_a$ is 0.3 microns. Alternatively, a raceway surface having a lay which is parallel to the rolling direction (i.e., a lay of 0°) and which possesses a surface texture or configuration having a roughness value $R_a$ of 0.1 microns is, in terms of friction producing effect, substantially the same as a raceway member having a surface lay arranged at an angle of 70° to the rolling direction and a surface texture or configuration defining a roughness value $R_a$ of 0.2 microns.

With reference to the various isofriction lines illustrated in FIG. 12, it has been found that a change in direction of lay from 0° to 70° causes a decrease in friction that is as large as the increase in friction caused by a change of surface roughness from $R_{a1}$ to $2R_{a1}$. It has also been found that a change in direction of lay from 0° to 90° causes a decrease in friction that is as large as the increase in friction caused by a change of surface roughness from $R_{a1}$ to $3R_{a1}$.

In order to obtain a significant difference in friction between the two raceway members 22, 24 or portions thereof, the roughness $R_a$ value of the respective surface textures must be sufficiently different. Assuming, for example, two portions of a raceway member having a surface lay parallel to the rolling direction (an angle of lay of 0°), the roughness $R_a$ associated with one portion of the raceway member should preferably be at least 25% larger than the roughness $R_a$ associated with the other portion of the raceway member to achieve sufficient differences in frictional coefficients between the two portions.

By way or example, assuming the same surface lay or orientation, one raceway member or portion of a raceway member which is to possess greater frictional characteristics to avoid excessive negative skew moment producing friction forces and achieve relative predominance of the positive skew moment producing friction forces should have a roughness $R_a$ of equal to or greater than 0.25 microns while the other raceway member or portion thereof which is to possess lesser frictional characteristics should have a roughness $R_a$ of equal to or lesser than 0.2 microns.

The double-headed arrow in the middle of the graph in FIG. 12 indicates the relative friction of raceway members or portions thereof having a particular surface lay and roughness value. Thus, a raceway member or portion thereof having a surface lay disposed perpendicular to the rolling direction and having an associated roughness $R_a$ of 0.1 microns will produce a relatively lesser amount of friction while a raceway member or portion thereof having a surface lay disposed parallel to the rolling direction and a roughness $R_a$ of 0.4 microns will produce a relatively greater amount of friction.

Thus, if it is determined in connection with the embodiment shown in FIGS. 6 and 7 that the outer center side region 54 and the innermost side region 56 of the outer raceway 34 should be provided with a surface lay of approximately 20° and a roughness $R_a$ of approximately 0.35 microns (see the area designated 70 in FIG. 12), the outermost side region 50 and the inner center side region 52 of the outer raceway 34 should preferably be configured to have a surface lay and a roughness $R_a$ located upward and to the left in the graph shown in FIG. 12 (e.g., in the direction of the area designated 72 in FIG. 12).

It is important to recognize, therefore, that changing one of the parameters (i.e., the surface lay) might also affect the other parameter to be chosen. For instance, if a particular value of friction (isofriction) is desired and one is considering whether to employ either a surface lay that is parallel to the rolling direction or a surface lay that is perpendicular to the rolling direction, the surface texture chosen should be different. In the case of a surface lay parallel to the rolling direction, the surface texture should have a roughness value $R_a$ that is smaller than if the surface lay is to be perpendicular to the rolling direction. With reference to FIG. 12, it is also to be understood that the frictional characteristics can be altered either by varying the direction of surface lay or by varying the surface roughness, or both.

Generally speaking, the areas of the inner raceway and outer raceway surfaces that are to be designed to possess higher friction to help avoid excessive negative skew moment producing friction forces and achievement of relative predominance of the positive skew moment producing friction forces should be provided with a surface roughness and surface lay that is in the direction of higher friction in FIG. 12.

By way of example, the inner and outer raceways 36, 34 can be configured with a surface lay similar to that shown in FIGS. 6 and 7, with the surface texture in the outer center side region 54 and the innermost side region 56 of the outer raceway 34 having roughness $R_a$ that is greater than the roughness $R_a$ associated with the surface texture in the outermost side region 50 and the inner center side region 52 of the outer raceway 34. Likewise, with the surface lay shown in FIGS. 6 and 7, the inner raceway 36 can be designed such that the roughness $R_a$ of the surface texture in the outer center side region 54 and the innermost side region 56 is less than in the outermost side region 50 and the inner center side region 52.

It has been found that if the thickness of the lubricant film is significantly greater or less than the surface roughness, it is difficult to achieve a significant difference in friction. Film thickness represents the separation of the mean lines of two contacting surfaces as a result of the pressure built up by the rolling motion in the oil between the surfaces. By maintaining the ratio of film thickness to composite surface roughness (composite surface roughness of two contacting surfaces is the square root of the sum of the two surface roughnesses squared) to between about 0.1 and 4.0, it is possible to achieve a significant difference in friction. Thus, the order of magnitude for the surface roughness should preferably be selected so that the ratio of film thickness to composite surface roughness is in the range of about 0.1 to 4.0. This typically means a surface roughness in the range of about 0.05 micrometers to 0.3 micrometers.

Another way of altering the frictional characteristics of the roller bearing in a way that will result in avoidance of excessive negative skew moment producing friction forces and achievement of a relative predominance of the positive skew moment producing frictional forces is to provide the raceways with one or more surface layers or surface coatings which will achieve the desired result. For example, the raceways 22, 24 are typically made of steel, and by providing one or more surface layers of material having a greater or lesser frictional coefficient, the frictional characteristics can be altered in the desired manner. Providing one or more layers of a relatively low friction material such as PTFE, DLC (diamond like carbide) or a soft metal (e.g., silver) on those portions of the inner and outer raceways 24, 22 where reduced friction is sought (i.e., regions 50, 52 on the outer raceway 22 and regions 54, 56 on the inner raceway 24) can result in reduced frictional characteristics in those areas of the raceways. Similarly, providing one or more layers of a relatively high friction material in those regions of the raceways where increased friction is desired (i.e., regions 54, 56 on the outer raceway 22 and regions 50, 52 on the inner raceway 24) causes an increase in the frictional characteristics in those regions of the raceways. Alternatively, the entire inner raceway 24 can be provided with one or more layers of the relatively low friction material while the entire outer raceway 22 can be provided with one or more layers of the relatively high friction material. The provision of one or more surface layers 70 applied to one of the raceways 22 is generally illustrated in FIG. 15.

The embodiments of the invention described above provide different alternatives for altering the frictional characteristics of the inner and outer raceways 36, 34 in a manner that will effect a predominance of the positive skew moment producing forces over the negative skew moment producing forces. However, in a manner known in the art, the osculation of the rollers and the raceways 34, 36 is also a factor in determining which skew moment predominates and whether the rollers skew in a desirable positive manner or an undesirable negative manner. Assuming the radii of curvature of the contacting members is constant, osculation is defined as the ratio between the radius of curvature of the roller 32 and the radius of curvature of the raceway 34, 36. When the radii of curvature of the contacting members is not constant, osculation is defined as the correspondence in shape of the profiles of the contacting members. When designing the roller bearing to avoid an excessively large negative skew angle in the manner described above, the osculation must also be considered and taken into account to ensure that it does not significantly counteract or adversely affect the desired objective. By way of example, a tighter outer raceway osculation should be considered when utilizing a rougher outer raceway surface (or selected rougher portions of the outer raceway surface) in order to avoid a loose outer raceway osculation which may inhibit the benefits sought to be achieved by utilizing a rougher outer raceway surface.

Figure 13:
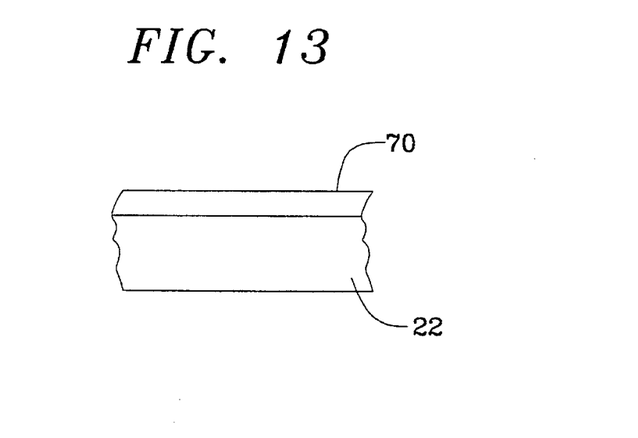
FIG. 13 is a cross-sectional view of a portion of a raceway illustrating a surface layer applied to the raceway to alter the frictional characteristics of the surface texture.

In addition to designing a roller bearing to control the skew experienced by the roller bearing during loading and operation, it is also important to design the roller bearing in a way that maximizes the useful life of the bearing, minimizes the degree of wear and provides sufficient load carrying capacity. As described above, the profile of the surface texture affects the roughness $R_a$ and hence the frictional characteristics associated with the surface. Another parameter associated with the raceway surfaces involves the shape of the surface profile. It has been found that the shape of the profile significantly affects the wear characteristics and life of the bearing. Generally speaking, a profile shape defined by non-pointed (i.e., substantially flat or rounded) peaks (see, for example, the profile shapes illustrated in the first and third surface profiles depicted in the table of FIG. 13) is highly desirable in achieving this objective.

To achieve these reduced wear and long life characteristics, the shape of the profile or grooves is selected to meet certain criteria. In particular, the shape of the surface profile should possess a root mean square slope $\Delta q$ (which is measured transverse to the direction of the lay) of greater than zero and less than 2.5°, with a preferred value being less than 15, and a skewness $R_{sk}$ of less than −1, preferably less than −2, wherein:

$$R_{sk} = \frac{1}{nR_q^3} \sum_{i=1}^{i=n} (Y_i)^3;$$

where $R_q$ is the root mean square parameter corresponding to $R_a$ and $$R_q = \sqrt{\frac{1}{L} \int_0^L Y^2(x)dx}$$

$$\Delta_q = \sqrt{\frac{1}{L} \int_0^L (\theta(x) - \overline{\theta})^2 dx} \quad ; \text{ where}$$

$$\overline{\theta} = \frac{1}{L} \int_0^L \theta(x)dx, \text{ and}$$

and $\theta$ is the slope of the profile at any given point.

In addition, it has been found that long life can be achieved by providing a profile shape which is selected so that the value $P_p/R_a$ is relatively low while the value $t_{p0.25}$ is relatively high. The term $R_p$ represents the maximum height of the profile above the mean line within the assessment length, while the term $t_{p0.25}$ represents the percentage of an assessment length which is located above a reference line located 25% (of the peak to valley height) below the peak(s) of the surface. These latter two parameters bear a defined relationship to the parameter $R_{sk}$ so that, generally speaking, a raceway surface having a profile which possesses a skewness value in the approximate range set forth above will also possess predefined $R_p/R_a$ and $t_{p0.25}$ values. It has been found that the value $R_p/R_a$ should preferably be less than about 1.5 while the value $t_{p0.25}$ is greater than about 40%. The table in FIG. 13 sets forth values for the aforementioned parameters associated with various cross-sectional profiles.

It is, of course, to be understood that the parameters $\Delta q$, $R_{sk}$, $t_{p0.25}$, and $R_p/R_a$ also affect the frictional characteristics of the surface profile. However, it has been found that when the values for $R_{sk}$, $\Delta q$, $R_p/R_a$ and $t_{p0.25}$ are selected within the numerical confines mentioned above, those parameters have a relatively small affect on the frictional characteristics of the raceway surface—the frictional characteristics mainly being controlled by the roughness $R_a$ value and the surface lay.

The provision of roller bearing in accordance with the present invention which is specifically designed to avoid excessive negative skew moment producing friction forces and achieve a relative predominance of the positive skew moment producing frictional forces so that the skew angle of the rollers is controlled to be not excessively negative is highly advantageous and useful. Such a roller bearing is not susceptible to the same excessive friction losses as other known bearings. However, in providing for surface textures in the desired areas which have a greater roughness to achieve such a result, the surface profile approaches a shape which would tend to reduce the long life attributes of the roller bearing. Thus, by designing the raceway surfaces with the additional provision of a profile that is specifically selected to achieve long life characteristics, it is possible to avoid excessive negative skew moment producing friction forces to the extent desired without also decreasing the useful life of the roller bearing. Also, it is possible to achieve an improvement in the ability of the roller bearing to carry load. Thus, the roller bearing according to the present invention operates much more efficiently and does not require the same frequency of replacement as other known roller bearings.

It is to be understood that the above description concerning surface roughness parameters and frictional characteristics refer to the composite surface roughness parameters and frictional characteristics of the raceway surfaces and the rollers as both contribute to the resulting attributes of the roller bearing. Further, the location of the rolling points 46 at which the frictional characteristics of the raceway surfaces change can be appropriately determined under normal operating conditions with the understanding that they shift in some small respects under normal operating loads. The raceways can be designed so that the points at which the frictional characteristics change (for example, from a high friction of coefficient to a low friction of coefficient) are located at the approximate midpoint of the expected range of shift experienced under normal operating loads.

The parameters $R_a$, $\Delta q$, $R_{sk}$, $t_{p0.25}$, and $R_p/R_a$ mentioned above are determined through use of Form Talysurf series equipment under the following measuring conditions. A Gaussian filter type is employed with a measuring tip radius of 2 μm. A measuring resolution of 10 nm or better is used for $R_a \leq 0.1$ μm while a measuring resolution of 30 nm or better is employed when $R_a > 0.1$ μm. Insofar as the direction in which the measurements are taken, one measurement is taken parallel to the rolling direction, another measurement is taken perpendicular to the rolling direction and a third measurement perpendicular to the lay is taken, if necessary, when the lay is other than parallel or perpendicular to the rolling direction. When $R_a \leq 0.1$ μm, a cut off of 2.5 μm is used for lowpass while a cut off of 0.25 mm is used for highpass. When $R_a > 0.1$ μm, a cut off of 8.0 μm is used for lowpass while a cut off of 0.8 mm is used for highpass. The area in which measurements should be taken and the required number of measurements are as follows.

When the roughness requirement is an upper or lower limit and the visually observed surface roughness of the whole surface area to be measured is homogeneous, three measurements are taken anywhere in the area to be measured (the third measurement being necessary if the surface lay is other than parallel or perpendicular to the rolling direction). Thus, in the embodiment of the invention described above where four different areas 50, 52, 54, 56 are provided across the width of a raceway surface, each of those areas 50, 52, 54, 56 must be measured so the aforementioned measurements are carried out in each area 50, 52, 54, 56.

When the roughness requirement is an upper or lower limit and visually observed deviations from homogeneity exist, three measurements are also taken (the third measurement being necessary if the surface lay is other than parallel or perpendicular to the rolling direction). However, rather than taking the measurements anywhere in the area being measured, the measurements are taken either at the part of the area where greatest roughness exists (when the requirements specify an upper limit) or the part of the area that is smoothest (when the requirements specify a lower limit).

When the roughness requirement is an upper and a lower limit and the visually observed surface roughness of the whole surface area to be measured is homogeneous, three measurements are taken anywhere in the area to be measured (the third measurement being necessary if the surface lay is other than parallel or perpendicular to the rolling direction).

When the roughness requirement is an upper and a lower limit and visually observed deviations from homogeneity exist, two measurements are taken. However, rather than taking the measurements anywhere in the area being measured, the measurements are taken either at the part of the area where greatest roughness exists (for upper limit requirements) or the part of the area that is smoothest (for lower limit requirements).

In theory, the values for the parameters $R_a$, $R_{sk}$, $t_{p0.25}$, and $R_p/R_a$ are not dependent upon the measurement direction, although experience has shown that this is not always the case. Thus, the preferred approach is to measure the value for the parameter $\Delta q$ in the three different directions as described above, take the highest measured value for $\Delta q$, and then measure the values for the other four parameters in the same direction. Thus, if it is found that the highest value for $\Delta q$ is obtained from the measurement in the direction parallel to the rolling direction, the values for the parameters $R_a$, $R_{sk}$, $t_{p0.25}$, and $R_p/R_a$ are also determined by making suitable measurements in the direction parallel to the rolling direction.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A roller bearing having an axis and comprising an inner member having at least one inner raceway and an outer member having at least one outer raceway, said at least one inner raceway and said at least one outer raceway being spaced apart to define an annular space in which is located a row of rolling elements, said rolling elements being adapted to engage the at least one inner raceway and the at least one outer raceway at respective contact zones, each rolling element having an axis and being positioned at a skew angle when the rolling element axis and the axis of the roller bearing are other than coplanar, said skew angle being positive when axial components of the friction forces acting on the rolling element and arising between the rolling element and either raceway in the respective contact zone are co-directional to an axial component of a normal force carried by the rolling element, and friction producing means for producing frictional coefficients at two spaced apart and separate first locations across a width of at least one of the outer raceway and the inner raceway which is different from a frictional coefficient at a second location disposed between the two first locations, said means for producing said first frictional coefficients at said two first locations being located at positions in which the friction forces acting on the rolling elements contribute to creation of a positive skew moment.

2. The roller bearing according to claim 1, wherein said two first locations possess different frictional coefficients.

3. The roller bearing according to claim 1, wherein the inner and outer raceways are each provided with an outermost side region located at an axially outermost region of the inner and outer raceways, an oppositely located innermost side region, an outer center side region located adjacent the outermost side region, and an inner center side region located between the innermost side region and the outer center side region, the innermost side region, inner center side region, outer center side region and outermost side region being consecutively disposed on the inner and outer raceways, said two first locations being the innermost side region and the outer center side region of the inner raceway, the second location being the inner center side region of the inner raceway, the frictional coefficient of said two first locations being smaller than the frictional coefficient of said second location.

4. The roller bearing according to claim 1, wherein the inner and outer raceways are each provided with an outermost side region located at an axially outermost region of the inner and outer raceways, an oppositely located innermost side region, an outer center side region located adjacent the outermost side region, and an inner center side region located between the innermost side region and the outer center side region, the innermost side region, inner center side region, outer center side region and outermost side region being consecutively disposed on the inner and outer raceways, said two first locations being the innermost side region and the outer center side region of the outer raceway, the second location being the inner center side region of the outer raceway, the frictional coefficient of said two first locations being greater than the frictional coefficient of said second location.

5. The roller bearing according to claim 1, wherein said friction producing means for producing a frictional coefficient in said two first locations which is different from the frictional coefficient in said second location includes said two first locations being provided with at least one of: 1) grooves oriented relative to the rolling direction in a manner different from an orientation of grooves in the second location; and 2) a surface roughness $R_a$ which is different from the surface roughness $R_a$ in the second location.

6. The roller bearing according to claim 1, wherein said inner and outer raceways each have a surface texture that possesses a skewness $R_{sk}$ value and a root means square slope $\Delta q$ value, the surface profiles of the inner and outer raceways being configured to possess at least one of a skewness $R_{sk}$ value less than $-1$ and a root mean square slope $\Delta q$ value less than 2.5 degrees.

7. The roller bearing according to claim 1, wherein said friction producing means includes said two first locations being provided with a coating having a relatively high friction coefficient so that the frictional coefficient at said two first locations is different from the frictional coefficient at said second location.

8. The roller bearing according to claim 7, wherein said second location is provided with a coating having a relatively low friction coefficient as compared to the friction coefficient of the coatings at said two first locations.

* * * * *